March 3, 1970     D. B. CHENOWETH     3,498,385
CUTTING TOOL WITH DETACHABLE BLADE MEANS
Filed Jan. 12, 1968     4 Sheets-Sheet 2
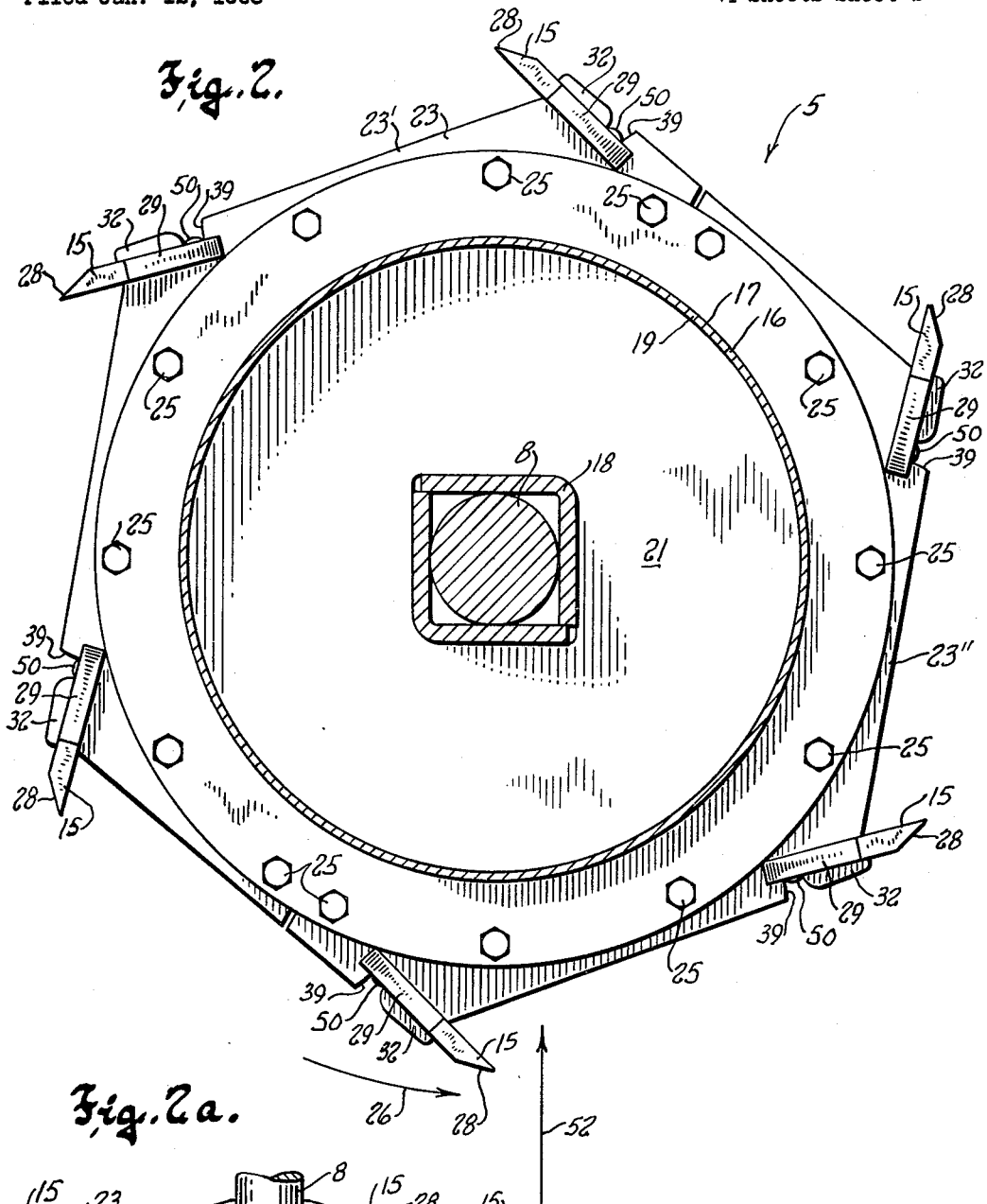
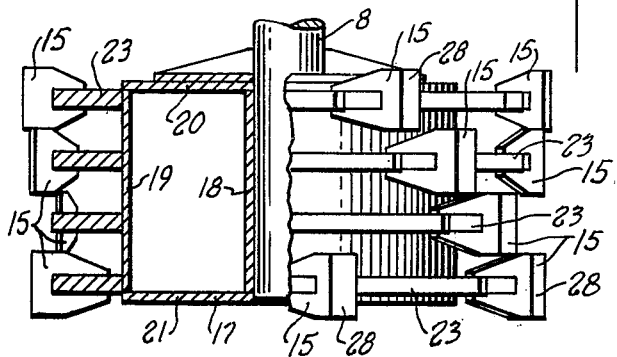
Inventor
Dean B. Chenoweth
By
Attorney March 3, 1970  D. B. CHENOWETH  3,498,385
CUTTING TOOL WITH DETACHABLE BLADE MEANS
Filed Jan. 12, 1968  4 Sheets-Sheet 3

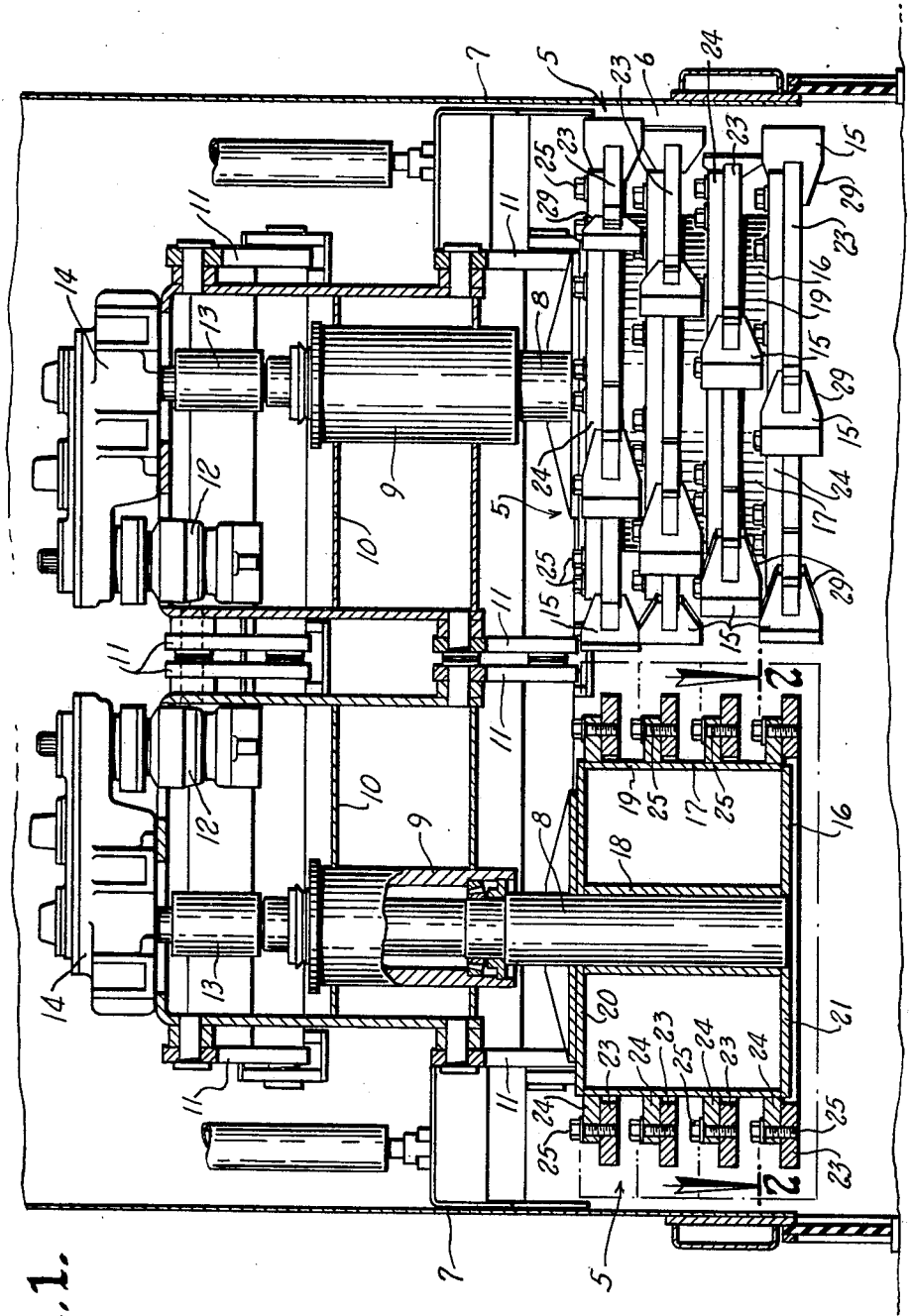

Inventor
Dean B. Chenoweth
By
Attorney

March 3, 1970 D. B. CHENOWETH 3,498,385
CUTTING TOOL WITH DETACHABLE BLADE MEANS
Filed Jan. 12, 1968 4 Sheets-Sheet 4
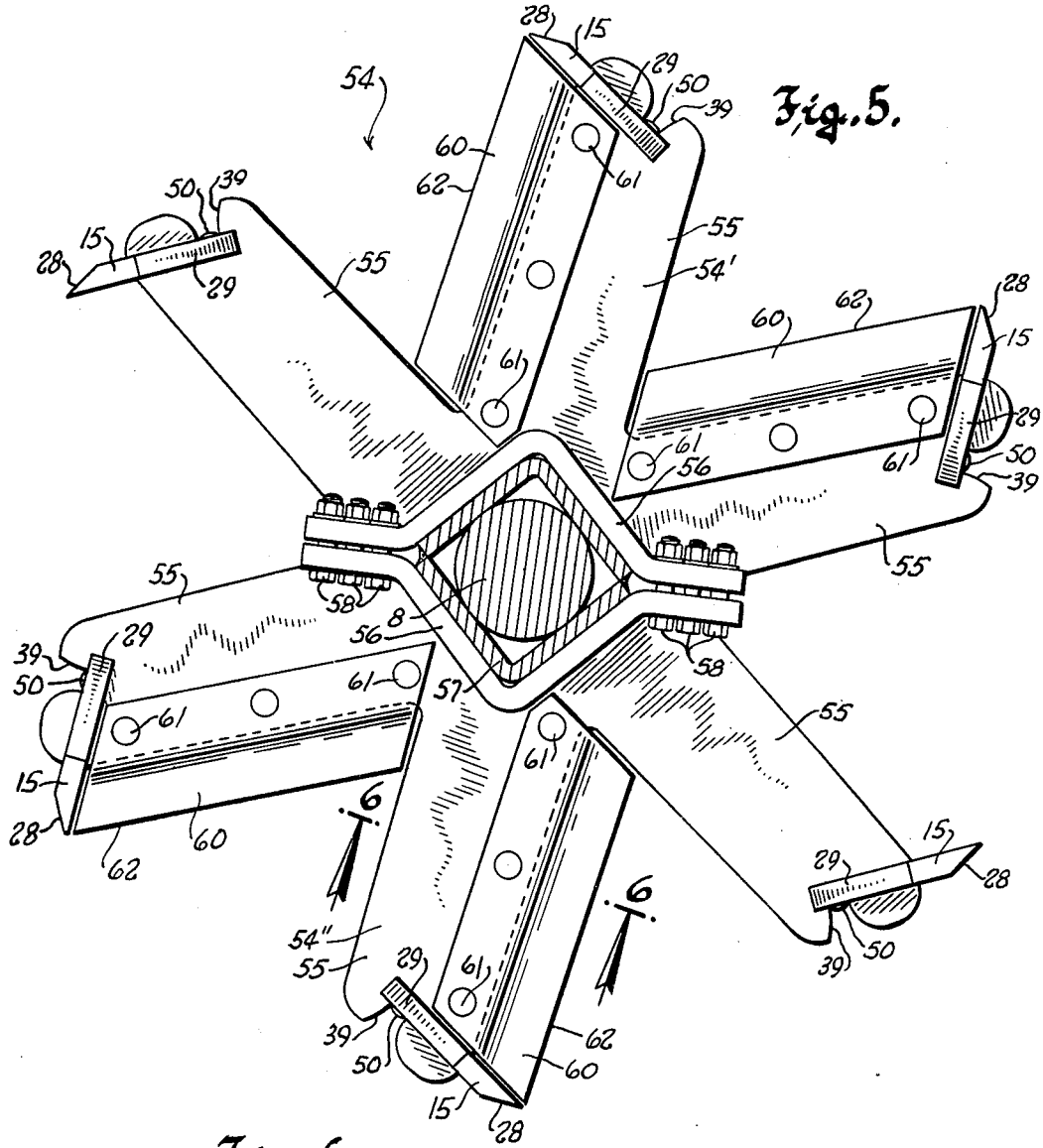

United States Patent Office 3,498,385
Patented Mar. 3, 1970

3,498,385
CUTTING TOOL WITH DETACHABLE BLADE MEANS
Dean B. Chenoweth, Minneapolis, Minn., assignor to RayGo, Inc., Minneapolis, Minn., a corporation of Minnesota
Filed Jan. 12, 1968, Ser. No. 698,685
Int. Cl. A01b 77/00, 33/06
U.S. Cl. 172—111                                 11 Claims

ABSTRACT OF THE DISCLOSURE

A cutting tool comprises a flat blade detachably but firmly mounted on a carrier without screw threaded fasteners. A number of such carriers fixed to a rotatable shaft provide a rotary cutting unit in which groups of angularly equispaced blades are mounted on each carrier with the blades of each group angularly offset with relation to the blades of the other groups.

---

This invention relates to cutting tools generally, and has more particular reference to rotary cutting units of a type which are admirably, though not exclusively, suited for use in soil working machines like that disclosed and claimed in the copending patent application of Gordon O. Garis and Raymond F. Roettger, Ser. No. 694,539, filed Dec. 29, 1967.

The soil working machine of said copending application features power driven rotary cutting units which are mounted in side by side relation in a mixing chamber and which are constrained to rotate on upright axes. This application, however, is concerned with the specific construction of the rotary cutting units per se of said copending application, and in the particular way in which the tines or blades are readily detachably mounted thereon.

Accordingly, it is an object of this invention to provide a cutting tool having blade means mounted on a carrier therefor in a way that obviates the use of pins or screw threaded fasteners and the like.

Another object of the invention is to provide a rotary cutting unit comprised of a number of such carriers all detachably mounted on a shaft and each having a plurality of said blades thereon.

More specifically, it is a purpose of this invention to provide an exceptionally sturdy rotary cutting stool suitable for use on large soil working an conditioning machines, and which features a rotor comprising a substantially large diameter drum fixed to one end portion of a shaft and having a cylindrical side wall to which said carriers are secured.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof, and in which:

FIGURE 1 is a view partly in elevation and partly in section, illustrating a pair of cutting units of this invention embodied in a soil working machine;

FIGURE 2 is a cross sectional view at an enlarged scale, taken on the line 2—2 in FIGURE 1, and illustrating the arrangement of the blading on one of the cutting units;

FIGURE 2a is a view partly in section and partly in elevation, illustrating a slightly modified cutting unit;

Figure 5 is a cross sectional view similar to FIGURE 2, but showing a modification thereof wherein the cutting blades are mounted on carriers comprising spiders; and FIGURE 6 is a cross sectional view taken on the plane of the line 6—6 in FIGURE 5, and at an enlarged scale.

Figure 3:
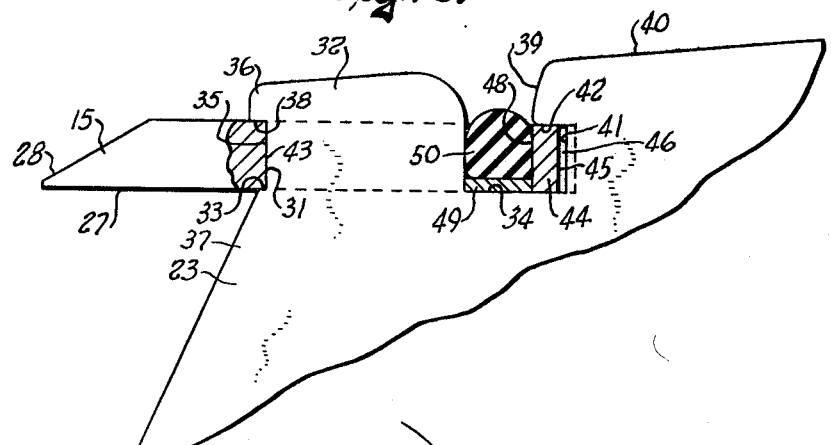
FIGURE 3 is an enlarged fragmentary view illustrating how each blade is mounted on its carrier.

Referring now to the accompanying drawings, the numeral 5 generally designates a cutting tool embodying this invention. For purposes of illustration, the cutting tool has been shown incorporated in a soil working machine such as is used in the preparation of a stable subgrade on road building projects and disclosed in the copending application of Gordon O. Garis and Raymond F. Roettger, Ser. No. 694,539, filed Dec. 29, 1967. It will be apparent as the description proceeds, however, that the cutting tool of this invention may be used to advantage for other than soil working purposes.

As seen in FIGURE 1, two such cutting tools are mounted within the mixing chamber 6 of a soil working machine, in close side by side relation and each closely adjacent to one of the side walls 7 of the mixing chamber. Each cutting tool comprises a shaft 8 having its medial portion journalled in a bearing 9 on the machine for rotation with its axis upright and lying in a plane that extends transversely across the mixing chamber and contains the axis of its companion cutting tool. The bearing 9 for each shaft is carried by a saddle 10 which is mounted in the mixing chamber for up and down motion to enable the cutting unit to be lowered to any desired cutting depth from an elevated or transit position clear of the round. Power operated parallelogram linkage 11 can be provided for that purpose.

The upper end of each shaft 8 is connected with a motor 12 through a coupling 13 and transmission means 14, to be driven at substantially high speed by the motor, so that cutting will be performed by the blades 15 of a cutting rotor 16 on the lower portion of the shaft.

The cutting rotor 16 comprises a spool shaped drum 17 having a tubular inner wall 18 telescoped over and fixed to the lower end portion of the shaft 8 as by welding, a large diameter cylindrical outer wall 19 concentric to the shaft axis, and top and bottom or end walls 20 and 21, respectively, normal to the shaft axis.

The drum has an axial length great enough to accommodate several annular blade carriers 23 which encircle the outer wall 19 of the drum at axially equispaced locations thereon. As here shown, there can be four such carriers 23 on the side wall of the drum, with each carrier in the form of a flat flange disposed edgewise with respect to the drum wall and flatwise secured by bolts 25 to one face of a mounting ring 24 also encircling and fixed to the drum. Preferably each carrier is comprised of two identical diametrical flange halves, as indicated by 23' and 23'', for ease of attachment and detachment.

If desired, the mounting rings 24 can be eliminated and the carriers or flanges 23 welded in position on the drum wall, as seen in FIGURE 2a. This has the advantage of allowing material cut by the blades to pass more freely around the wall of the drum than when the carriers are attached to mounting rings 24.

Figure 4:
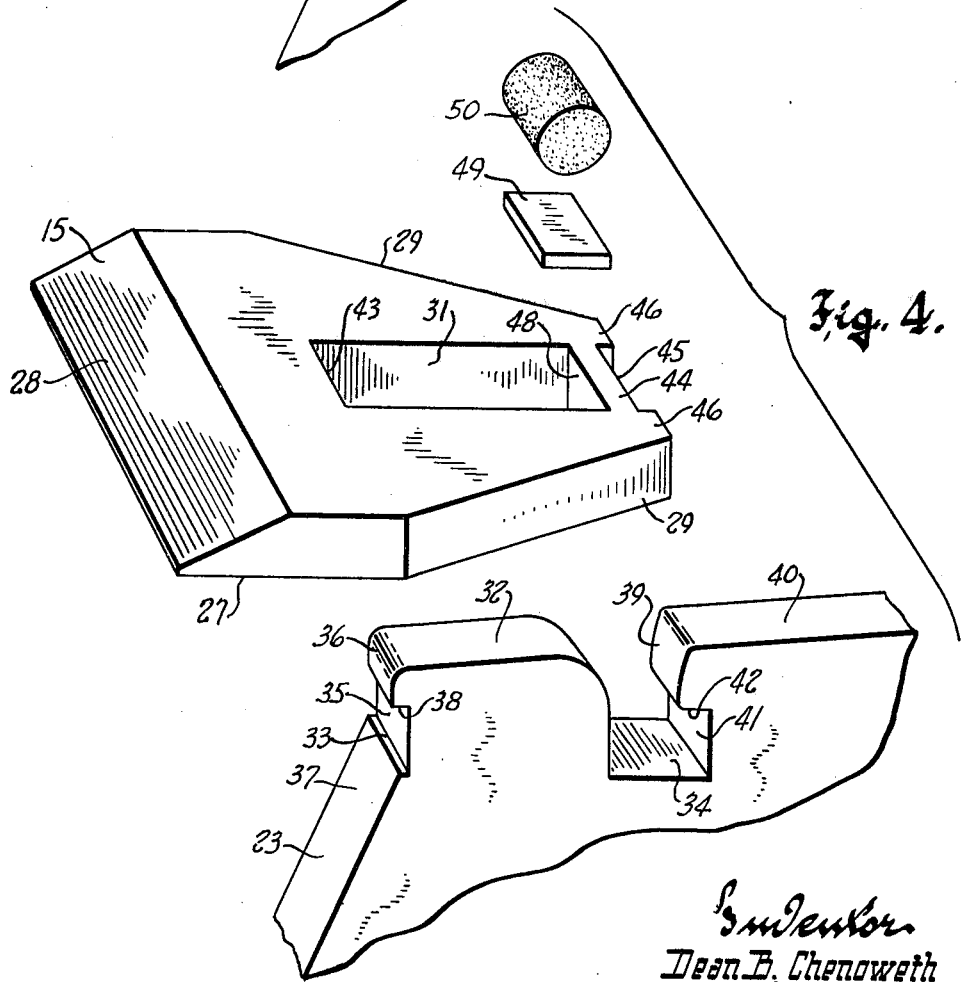
FIGURE 4 is view similar to FIGURE 3 but in perspective and showing the blade detached from the carrier.

The rotary cutting tool illustrated has six angularly equispaced tines or blades 15 on each carrier 23, three on each of its halves, and the cutting edges 28 on the blades travel in an orbit axially contiguous to that of the cutting edges of the blades on an adjacent carrier. It is a feature of this invention that each such blade is held on its carrier without the use of pins or screw threaded fasteners of any kind. For this puropse, each blade and its carrier is formed in a way that minimizes the tendency of reaction forces imposed on the blade as an incident to cutting during rotation of the tool in the direction of the arrow 26 in FIGURE 2, to dislodge the blade and cause detachment thereof from the carrier. FIGURES 3 and 4 best illustrate the way in which each blade is mounted on its carrier to achieve this desired result.

Each carrier 23 is roughly in the form of a hexagon, when viewed in plan as in FIGURE 2, and one blade 15 is mounted thereon at each of its corners.

The blades are made from flat bars having substantial thickness, and each such blade has an elongated body portion which is disposed with its opposite faces parallel to the shaft axis and nearly tangent to the periphery of the ring 24 to which its carrier 23 is secured. With reference to FIGURES 3 and 4, the blade is mounted in lengthwise but inwardly offset relation to one side edge 40 of the hexagonal carrier at its corner, and with the blade extending outwardly of and a distance beyond the adjoining side edge 37 of the carrier.

The projecting end portion of the blade comprises its leading or cutting end. Its extremity is bevelled rearwardly away from the underside 27 of the blade to provide a wide chisel-like cutting edge 28 thereon. The opposite side edges of the blade can, if desired, be tapered as at 29 so as to converge toward the rear end of the blade.

An elongated flat sided slot 31 in the body of the blade, extending lengthwise through the center portion of the blade body, provides for mounting the blade on an elongated lug 32 formed on the carrier, with the underside 27 of the blade resting upon ledges 33 and 34 at each end of the lug. The forward ledge 33 comprises one edge of a notch 35 in the forward end 36 of the lug. This notch opens outwardly to the side edge portion 37 of the carrier from which the cutting end of the blade projects. The side edge 38 of the notch opposite the ledge 33 overlies the outer face of the blade adjacent to the forward end of its slot 31 and provides a ledge that prevents the blade from being lifted off of the ledge 33.

A notch 39 defines the rear end of the lug 32, and opens to the adjoining side edge portion 40 of the carrier. Its bottom provides the rear ledge 34.

The bottom portion of the notch 39 is deepened as at 41 to in effect provide an inner notch that opens toward the rear of the lug 32, and to also define an overhang 42 that engages over a rear portion of the blade to prevent it from being lifted off of the rear ledge.

It is significant to note that the rearwardly facing edge 43 of the slot 31 in the blade engages the bottom or outwardly facing edge of the notch 35 at the front of the lug 32; that the forwardly facing edge 48 of the slot 31 is normally spaced a distance from the rear of the lug 32; and that a rear end portion 44 of the blade engages under the overhang 42 in the notch behind the lug to normally prevent displacement of the blade from the lug on the carrier. If desired, the rear end of the blade can also be notched as at 45, to provide bifurcations 46 that engage the opposite faces of the carrier to lend stability to the connection of the blade thereto. Ordinarily, however, the lug 32 has a snug enough fit in the slot 31 in the blade to assure adequate stability for the latter.

It is also significant to note that removal of the blade from the carrier entails endwise forward movement of the blade relative to the carrier to a detaching position at which the blade is clear of the overhanging portions 38 and 42 on the carrier, and from which detaching position the blade can be flatwise lifted off of the lug 32. This detaching position can be defined by the engagement of the forwardly facing edge 48 of the slot in the blade with the rear end of the lug 32.

Such endwise forward motion of the blade relative to the carrier is normally prevented by spacer means inserted into the slot 31 in the blade and confined between its forwardly facing edge 48 and the rear of the lug 32. The spacer means comprises a flat nonyielding inner spacer 49 of metal or the like, resting upon the rear carrier ledge 34 behind the lug 32, and an elastically deformable outer spacer 50, of rubber-like material which is wedged into the blade slot over the inner spacer 49 to retain the same in place. As seen best in FIGURES 3 and 4, the outer spacer 50 can be in the form of a cylinder to facilitate its insertion into and removal from the rear portion of the blade slot.

Detachment of the blade, as for sharpening of its chisel-like outer end, merely involves removal of first and outer spacer 50 and then the inner nonyielding spacer 49, to enable the blade to be moved forwardly to its detaching position described earlier.

Cutting, of course, is accomplished by rotating the cutting unit in the direction to engage the cutting edges of the blades thereon with the material to be cut, while effecting relative feeding movement between the cutting unit and the material being acted upon thereby. This ordinarily involves advancing the cutting unit toward the material to be cut, in the direction of the arrow 52, while driving its shaft in the direction of the arrow 26. It will thus be seen that due to the position of the blades as defined by their supporting ledges 33 and 34, the reaction forces on the blades incidental to cutting are carried lengthwise through the blades to the bottoms of the notches 35 in the fronts of their mounting lugs 32, with little or no tendency to tilt the blades flatwise off of their mounting lugs.

In the modified embodiment of the invention seen in FIGURES 5 and 6, each of the blade carriers comprises a spider 54 detachably fixed to the lower end portion of the shaft 8 and having six angularly equispaced arms 55 with a blade 15 removably mounted on the outer end portion of each of said arms in the manner described previously. In this case also, each spider is made up of identical complementary spider halves 54' and 54", each having three arms extending radially from an angle shaped hub portion 56. The two hub portions cooperate to define a square cross section hub that embraces a tube 57 of corresponding shape and which is welded in place over the shaft 8. Bolts 58 hold the hub portions together and in place upon the tube 57.

If desired, one or more elongated radial grader blades 60 can be secured by bolts 61 to the leading edges of the arms on each bottom spider half, with their cutting edges 62 spaced a distance ahead of the arms and bent downwardly as seen in FIGURE 6.

From the foregoing description, together with the accompanying drawings, it will be apparent to those skilled in the art that this invention provides an improved cutting tool featuring blades that are held in place entirely without the use of pins or screw threaded fasteners.

What is claimed as my invention is:

1. A rotary cutting unit of the type comprising a rotatable shaft having tine carrier means thereon and a number of angularly equispaced elongated tines on the carrier means spaced a uniform distance from the shaft axis and projecting lengthwise outwardly relative thereto, said cutting unit being characterized by:
   (A) each of said tines comprising a flat blade having:
      (1) an elongated body tangent to a circle concentric with the shaft axis and substantially larger in diameter than the shaft;
      (2) a cutting edge on the outer end of the body;
      (3) and an elongated slot in the body extending lengthwise thereof;
   (B) the carrier means having means to detachably support each blade, comprising:
      (1) an elongated lug snugly engaged in the blade slot and of a length to provide for limited outward movement of the blade relative to the carrier means;

(2) and notch means at opposite ends of said lug, in which portions of the blade adjoining the ends of its slot engage to prevent displacement of the blade from said lug except upon outward lengthwise movement of the blade relative to the carrier means;

(C) and spacer means readily removably confined in the inner end of said slot to prevent such outward lengthwise movement of the blade relative to the carrier means.

2. The rotary cutting unit of claim 1, wherein said spacer means comprises:

(A) a non-yieldable spacer disposed adjacent to the base of said lug;

(B) and a yieldable spacer superimposed upon the non-yieldable spacer to hold the same in place.

3. The rotary cutting unit of claim 2, wherein said yieldable spacer is provided by a cylinder of elastic material such as rubber or the like.

4. The rotary cutting unit of claim 1, further characterized by:

(A) said carrier means comprising a spider fixed with respect to the shaft and having a number of angularly equispaced arms radiating outwardly from the shaft;

(B) and said blades being detachably mounted on the outer end portions of said arms.

5. The rotary cutting unit of claim 4, further characterized by other blade means on one of said spider arms, having its cutting edge extending lengthwise along that edge of the arm which leads during rotation of the cutting unit in the direction to render the blades on the outer ends of the spider arms effective.

6. A cutting tool of the type having a cutter and a carrier therefore to move the cutter in one direction into material to be cut, characterized by:

(A) said cutter comprising a flat blade having
(1) a substantially flat elongated body disposed lengthwise with respect to said direction of movement of the cutter;
(2) a forward edge which is bevelled rearwardly away from one face of the blade to provide a chisel-like cutting edge on the front of the blade;
(3) and an elongated slot in the body of the blade extending lengthwise thereof;

(B) the carrier having:
(1) spaced apart ledges to supportingly engage said one face of the blade at areas thereof adjacent to the front and rear ends of the blade;
(2) an elongated lug intermediate said ledges and projecting snugly into the forward portion of the blade slot;
(3) forwardly opening notches, one in which the rear end portion of the blade is received and the other in the front of the lug to receive an edge portion of the blade adjoining the forward end of its slot, said notches holding the blade against flatwise detachment from the lug except when the blade is moved forwardly thereon to a detaching position disengaged from said notches;

(C) and removable spacer means in the blade slot, between the rear end of the slot and the rear end of the lug, to prevent such forward movement of the blade to said detaching position.

7. The cutting tool of claim 6, wherein said spacer means comprises:

(A) a nonyielding spacer resting upon the ledge at the rear of the blade and of less thickness than the blade;

(B) and a yieldable spacer superimposed upon said non-yieldable spacer.

8. The cutting tool of claim 7, wherein said yieldable spacer comprises a body of elastic material, such as rubber or the like.

9. A rotary cutting unit for soil conditioning machines, comprising:

(A) a power driven rotor;

(B) a blade carrier having a plurality of circumferentially spaced lugs flanked by radially outwardly facing circumferentially leading and trailing blade supporting surfaces; the lugs having flat faces perpendicular to the rotor axis;

(C) an elongated cutting blade for each lug, each blade having an inner and an outer face, a cutting edge on its front end and a longitudinally extending slot medially of its slide edges and between the front and rear ends of the blade, the slot opening to the inner and outer faces of the blade and being of a size to receive the lug; and (D) retaining means detachably holding each blade on its lug with the inner face of the blade seated upon said outwardly facing blade supporting surfaces and the cutting edge of the blade straddling the lug but forwardly thereof.

10. The rotary cutting unit of claim 9, whersein each of said retaining means comprises radially inwardly facing ledges fixed with respect to the lugs and blade carrier overlying the leading and trailing blade supporting supporting surfaces, to engage the portions of the outer face of the blade forwardly and rearwardly of the ends of its slot and by such engagement hold the blade on the blade supporting surfaces, engagement of said blade portions under the ledges entailing lengthwise shifting of the blade in one direction after its placement on the lug; and removable blocking means reacting between opposing surfaces on the blade and on the blade carrier to prevent unintentional shifting of the blade in the opposite direction.

11. The rotary cutting unit of claim 10, wherein said ledges face forwardly with respect to the direction of rotation of the rotor; and wherein said opposing surfaces between which the blocking means reacts are the rear end of the blade and a forwardly facing edge portion of the blade carrier.

References Cited

UNITED STATES PATENTS

| | | | |
|---|---|---|---|
| 1,342,815 | 6/1920 | Ingram | 172—59 |
| 1,415,663 | 5/1922 | Lilleberg | 172—554 X |
| 2,088,141 | 7/1937 | Royston | 172—111 X |
| 2,138,472 | 11/1938 | Chong | 172—548 |
| 2,879,855 | 3/1959 | Kleiser | 172—526 |
| 2,923,536 | 2/1960 | Marshall et al. | 299—91 X |
| 3,362,482 | 1/1968 | Riddle | 172—123 X |
| 3,375,764 | 4/1968 | Petersen | 37—142 X |

ROBERT E. PULFREY, Primary Examiner

STEPHEN C. PELLEGRINO, Assistant Examiner

U.S. Cl. X.R.

172—122, 554; 287—103; 299—91

UNITED STATES PATENT OFFICE
CERTIFICATE OF CORRECTION

Patent No. 3,498,385                                  March 3, 1970

Dean B. Chenoweth

It is certified that error appears in the above identified patent and that said Letters Patent are hereby corrected as shown below:

Column 1, line 47, "stool" should read -- tool --; line 48, "an" should read -- and --. Column 2, line 37, "round" should read -- ground --. Column 6, line 30, "whersein" should read -- wherein --.

Signed and sealed this 4th day of August 1970.

(SEAL)
Attest:

Edward M. Fletcher, Jr.                       WILLIAM E. SCHUYLER, JR.
Attesting Officer                                   Commissioner of Patents